United States Patent [19]
Rothchild

[11] Patent Number: 5,387,347
[45] Date of Patent: Feb. 7, 1995

[54] METHOD AND APPARATUS FOR CONTINUOUS CHROMATOGRAPHIC SEPARATION

[76] Inventor: Ronald D. Rothchild, c/o Center for Concept Development, 33 State Rd., Princeton, N.J. 08540

[21] Appl. No.: 120,777

[22] Filed: Sep. 15, 1993

[51] Int. Cl.⁶ ............................................. B01D 15/08
[52] U.S. Cl. .................... 210/659; 210/198.2; 127/461; 127/462; 127/463
[58] Field of Search ............... 210/635, 656, 659, 672, 210/691; 127/46.1, 46.2, 46.3, 55

[56] References Cited

U.S. PATENT DOCUMENTS

| | | | |
|---|---|---|---|
| Re. 33,105 | 10/1989 | Sherman | 127/46.3 |
| 3,310,486 | 3/1967 | Broughton | 208/310 |
| 3,715,409 | 2/1973 | Broughton | 260/674 SA |
| 4,267,054 | 5/1981 | Yoritomi | 210/659 |
| 4,402,832 | 9/1983 | Gerhold | 210/659 |
| 4,478,721 | 10/1984 | Gerhold | 210/659 |
| 4,482,761 | 11/1984 | Chao | 127/55 |
| 4,591,388 | 5/1986 | Chao | 127/46.3 |
| 4,970,002 | 11/1990 | Ando | 210/659 |
| 4,990,259 | 2/1991 | Kearney | 210/659 |
| 5,064,539 | 11/1991 | Tanimura | 210/659 |
| 5,093,004 | 3/1992 | Hotier | 210/659 |
| 5,102,553 | 4/1992 | Kearney | 210/659 |
| 5,114,590 | 5/1992 | Hotier | 210/659 |
| 5,122,275 | 6/1992 | Rasche | 210/659 |
| 5,156,736 | 10/1992 | Schoenrock | 210/659 |

OTHER PUBLICATIONS

Saska, "An Audubon Sugar Institute–Applexion Process for Desugarization of Cane Molasses", Sugar Industry Technologists paper #649 Jun. 1993, pp. 9–18.

*Primary Examiner*—Ernest G. Therkorn

[57] ABSTRACT

The invention disclosed is a method and apparatus for moving-bed or simulated-moving-bed continuous chromatographic separation, in which some solvent is removed from the elution liquid at a point between the two zones where fractionation takes place. The resulting product streams have higher recovery and purity than without such solvent removal.

9 Claims, 2 Drawing Sheets

METHOD AND APPARATUS FOR CONTINUOUS CHROMATOGRAPHIC SEPARATION

FIELD OF THE INVENTION

The present invention relates to a method for improving the separation performance and economy of moving bed (or simulated moving bed) ion exclusion systems, by removing some solvent from the elution liquid at a point between the two zones where fractionation takes place.

DESCRIPTION OF THE PRIOR ART

Production scale continuous liquid chromatography, which is often referred to as ion exclusion (and which will be abbreviated throughout this specification as "LC"), is widely used to perform large scale product separations that would otherwise not be commercially feasible. It requires no chemical reagents and therefore produces no chemical waste. It is inherently a binary separation process yielding two streams containing fractions with different adsorption characteristics, although the fractionation is not perfect. It is technically possible to separate more than two fractions, but the means to do so have not seen wide commercial application. With that qualification, LC can in principle be applied to virtually any separation of dissolved components.

The first significant commercial application of LC was in the separation of glucose and fructose to produce high fructose corn syrup (HFCS). All U.S. producers of HFCS use the process. It is also now widely used in the separation of beet molasses, to extract additional sugar that would otherwise be lost to an extremely low value by-product. Almost all of the LC equipment in service is based on the simulated moving bed concept.

Figure 1:
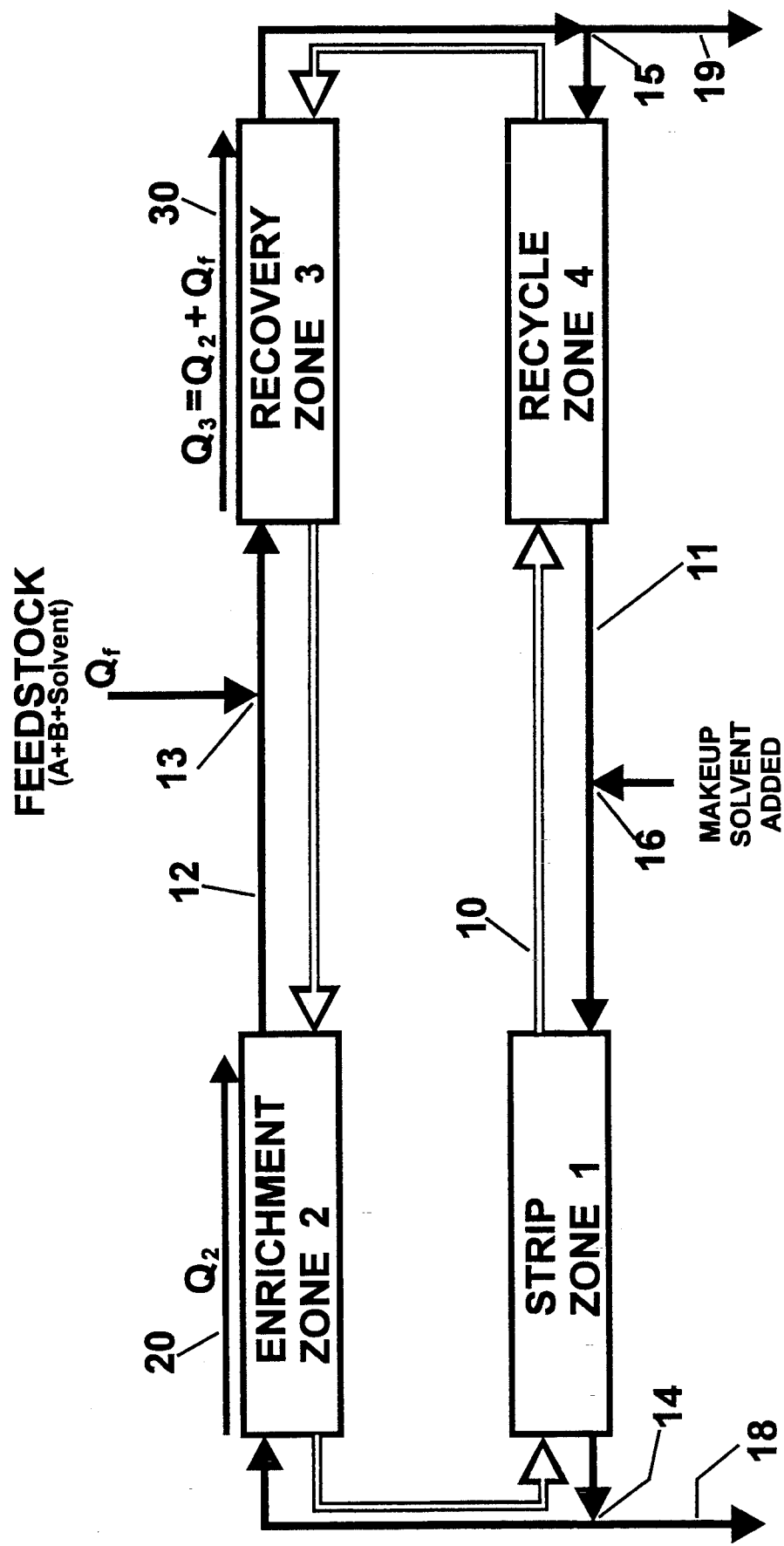
FIG. 1 is a schematic flow diagram of a typical prior art ion exclusion system.

Operation of the simulated moving bed is illustrated in FIG. 1, which will be familiar to those who have worked with LC. The system has multiple columns in series which are arranged in multiple "zones", most typically four in number, which are defined by their positions relative to inlet and outlet ports. Each zone is located between two otherwise adjacent ports and contains at least one column. Each column is filled with an adsorbent packing, which is typically a synthetic resin.

Referring to FIG. 1, the resin is made to "move" through the four zones shown. In the simulated moving bed system the resin is actually stationary while inlet and outlet switching valves move the ports which define the zone boundaries. In a true moving bed system the zones would be stationary while the resin actually moved. Conceptually the result is the same either way.

According to FIG. 1, 11 is an elution liquid that circulates through all four zones. Feedstock and makeup water are added to the elution flow at ports 13 and 16 respectively. A fraction 18 rich in component A and a fraction 19 rich in component B are drawn from the elution flow at outlet ports 14 and 15 respectively.

The flow of elution liquid 11 is different in magnitude in each zone because of the addition or withdrawal of a flow rate of liquid at each port. The flow of elution liquid in zone 2 is denoted as flow 20 with volume flow rate $Q_2$, and in zone 3 as flow 30 with volume flow rate $Q_3$.

As illustrated, the resin flow 10 is counterclockwise. Meanwhile liquid 11 flows through the zones, shown clockwise, countercurrent to the resin flow 10. Elution liquid flows through zone 2, then through conduit means 12 to zone 3, and through zone 3. It is in these zones 2 and 3, denoted the enrichment and recovery zones respectively, that the separation takes place.

Liquid feedstock is added to the system at inlet port 13 along conduit 12. The feedstock includes first and second components A and B dissolved in a solvent, and has volume flow rate $Q_f$. As a practical matter the solvent used is water in both the beet molasses and HFCS applications, so the terms "solvent" and "water" are used interchangeably here. It should be understood, however, that any suitable solvent may be used depending upon the substances being separated.

A process stream 18 consisting primarily of A and water is drawn from the system at outlet port 14, and a stream 19 consisting primarily of B and water is drawn from the system at outlet port 15. In practice, A-rich stream 18 and B-rich stream 19 each contain at least a small quantity of the other since the separation is not perfect. A and B may comprise, for example, the sugar and non-sugar constituents of molasses, respectively.

When being eluted with a flow of liquid 11 through a column in zone 2 or 3, both A and B travel through the column with the liquid, but each with its own relative velocity to the resin, which is some fraction of liquid relative velocity $V_s$. For the sake of simplicity it can be reasonably approximated that the relative velocities of A and B are proportional to $V_s$ by a constant (though in fact the relationships are not quite linear):

$$V_a = C_a V_s$$
$$V_b = C_b V_s \qquad C_a < C_b < 1$$

Meanwhile the resin through which the liquid is flowing is moving, intermittently in a simulated moving bed, in the opposite direction with effective average velocity $V_r$. Separation will take place if:

$$V_a < V_r < V_b$$

As a result of this inequality, A will tend to be carried counterclockwise by the resin with effective velocity $(V_r - V_a)$, while B will tend to flow clockwise past the resin with velocity $(V_b - V_r)$.

In theory virtually complete separations should be attainable with very little solvent used, since the simulated moving bed can simulate an infinitely long column. Even though the solvent is water, its removal when concentrating product streams is LC's primary operating cost. Makeup water is added to the system at inlet port 16 to compensate for water leaving the system with streams 18 and 19.

Separation performance in practice has been disappointing, with both product recovery and purity limited to about 90% and with a large quantity of water required. Either purity or recovery can be made higher than about 90%, but only by making the other lower. Technically both could be made higher but with uneconomically low production rates.

The most difficult of the commercially practiced separations is that of beet molasses. Separation performance is limited as described above and the process is extremely energy intensive. For each 1 lb of refined sugar resulting from the separation, the LC process adds approximately 16 lb of water which is subsequently removed by evaporation.

One of the factors that limits overall performance is that $V_s$ is different in zones 2 and 3, and therefore so are $V_a$ and $V_b$. The columns are as close to identical as can be made, but the volume flow rate $Q_2$ of flow 20 through zone 2 is lower than the volume flow rate $Q_3$ of flow 30 through zone 3, because of the addition of feedstock with volume flow rate $Q_f$ at 13:

$$Q_2 < Q_3 = Q_2 + Q_f$$

$V_s$ is related to Q by a geometry factor that is the same in both zones, and resin velocity $V_r$ is the same in both zones, so the inequality above leads to:

$$(Q_2 + Q_f)/Q_2 < C_b/C_a$$

in order for separation to take place. Otherwise, for example, if $V_s$ is perfect in zone 2 it will be too large in zone 3, and A will be swept past the resin along with B. Moreover, in order to obtain a high level of separation performance:

$$(Q_2 + Q_f)/Q_2 << C_b/C_a$$

In a difficult separation such as beet molasses, the two component velocity coefficients $C_a$ and $C_b$ may be very similar, so:

$$(C_b/C_a) - 1 << 1$$

and:

$$((Q_2 + Q_f)/Q_2) - 1 = Q_f/Q_2 << (C_b/C_a) - 1 << 1,$$

so:

$$Q_f/Q_2 <<< 1$$

Therefore in order to obtain a high level of separation performance, either the feedstock volume flow rate $Q_f$ must be very small, or the elution flow rate $Q_2$ through the column must be very large. That this represents the current state of the art is confirmed in some of the most recent research literature (see M. Saska et. al., "An Audubon Sugar Institute—Applexion Process for Desugarization of Cane Molasses", Sugar Industry Technologists paper #649, June 1993, which offers as guidelines "minimize feed volume" and "maximize the recycle rate"). However small $Q_f$ corresponds to a low production rate, and there are practical constraints on how large $Q_2$ can be. As a result, real process conditions are always a compromise and separation performance is limited.

Importantly $Q_2$, the elution flow rate, is not determined by transport requirements. $Q_2$ could be much smaller if that was the case. Instead, the lower limit of $Q_2$ is established by the requirement that it be very large compared with feedstock flow rate $Q_f$.

SUMMARY OF THE INVENTION

In accordance with the present invention, a portion of solvent is removed from the elution liquid flow of a simulated moving bed ion exclusion, or liquid chromatography (LC), separator system. The solvent is removed from the elution liquid where it is in transit between the separator's enrichment and recovery zones, the same transition region where feedstock to be separated is added. The quantity of solvent removed is such that the resulting reduction in the volume flow rate of elution liquid is similar in magnitude to the volume flow rate of feedstock. Because of this, the difference between elution liquid velocities in the two adjacent zones is significantly reduced.

DETAILED DESCRIPTION OF THE INVENTION

Figure 2:
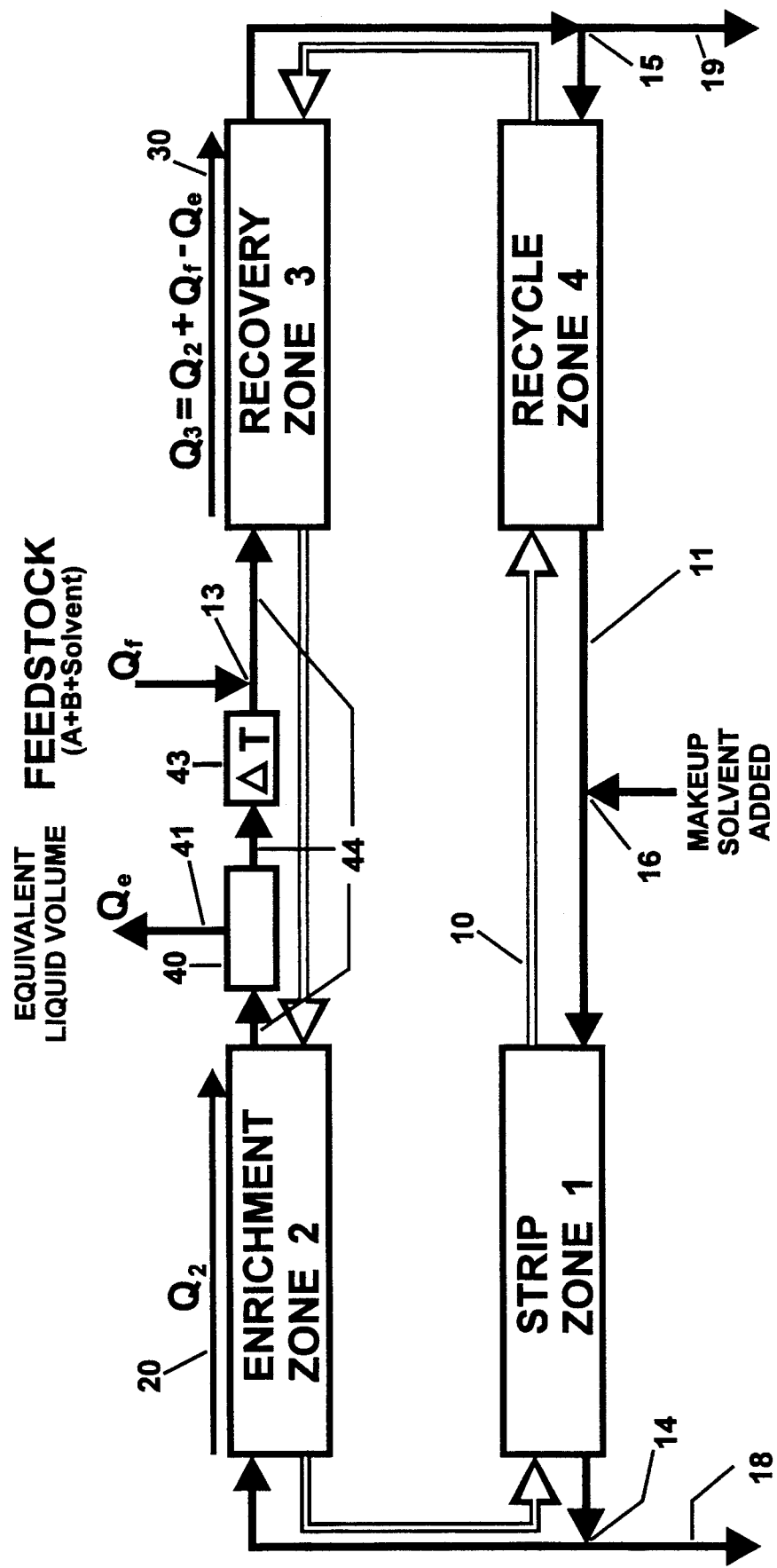
FIG. 2 is a schematic flow diagram of the ion exclusion system according to the present invention.

A schematic diagram of the LC system according to the present invention is shown in FIG. 2, illustrating also the process' operation. The four zones of the LC system are, as in prior art, defined by the positions of the inlet and outlet ports. With respect to the flow of liquid 11 through the system, the enrichment zone 2 is upstream, the recovery zone 3 is downstream, of feedstock inlet port 13 in conduit means 44.

The primary difference between the present invention and prior art is that the present invention includes conduit means 44 to divert at least a portion of elution flow 20 through solvent removal means 40, to remove a stream 41 of solvent from flow 20, with $Q_e$ being the equivalent volume flow rate of stream 41. In addition, the diverted portion of flow 20 may pass through time delay means 43.

$Q_e$ is equal to the amount that the volume flow rate $Q_2$ is reduced as flow 20 passes through means 40. In general $Q_e$ will be similar in magnitude, but not equal to, the actual volume flow rate of stream 41.

Means 40 for the removal of solvent stream 41 from flow 20 is preferably an evaporator. However it should be understood that means 40 could also be, for example, a membrane filtration system, or any process operation to selectively remove solvent.

In some separations, however, such as beet molasses, means 40 may also remove a portion of molasses impurities along with water, as long as it removes little or no sucrose from stream 20. In general, solvent removal means 40 may also remove a portion of either component A or B from stream 20, but not both, since it is intended that components A and B be drawn from the system in substantially purified form.

Solvent removal means 40 should have two additional properties for best performance, to minimize distortion of dissolved component concentration waveforms as they pass through means 40. First, flow through means 40 should approximate "plug flow" in which each cross-section of flow passes with significant distortion, and without significant mixing with elements of flow ahead of or behind it.

Second, the period of time during which liquid is held diverted, which is its residence time in means 40, should ideally be zero. Since that is not possible, then the residence time should be approximately equal to an integer multiple of the simulated-moving-bed switching time; the time that a column resides in a single position. In this way concentration waveforms, which are repetitive with a period equal to switching time, will remain synchronized.

It would be very difficult to design an evaporator, for example, to have a predetermined residence time as well as meeting other specifications, especially as that time must be adjustable to accomodate the bed switching period as the system parameters are optimized. Therefore means 43 is provided to add a consistent and adjustable time delay so that flow is held diverted for a total period that is approximately an integer multiple of the bed switching interval. Means 43 may be, for example, a dummy packed column, with substantially non-porous and non-adsorbent packing and adjustable height, the function of which is to provide an adjustable fluid residence time.

FIG. 2 shows the entire flow 20 passing through solvent removal means 40, which is preferred but not required. What is important is the amount of solvent removed as process stream 41, which is approximately equal to $Q_e$. It is possible to remove process stream 41 from only a portion of flow 20, and bypass the remainder of flow 20 around means 40 to zone 3. However removal of a quantity $Q_e$ of solvent from only a small portion of flow 20 could result in the concentration of dissolved solids in that portion becoming excessive. Moreover if the portion of flow 20 that passes through means 40 is too small, the desired equivalent flow rate to be removed as $Q_e$ may simply not be available.

Therefore the portion of flow 20 that passes through solvent removal means 40 should have volume flow rate at least about twice the feedstock flow rate $Q_f$. Preferably, to avoid high concentrations of dissolved solids and minimize viscosity effects, the entire flow 20 should be diverted to means 40.

In order to effect a significant improvement in LC performance, the equivalent volume flow rate $Q_e$ of solvent removed should be at least equal to or greater than about ½ of feedstock volume flow rate $Q_f$. Preferably, if:

$$Q_e = Q_f$$

then:

$$Q_3 = Q_2$$

and it becomes theoretically possible to obtain a near perfect separation without encountering the difficulties associated with extreme high $Q_2$.

Because of the process flexibility brought about by evaporator 40, it is also possible to operate with:

$$Q_e > Q_f$$

which leads to:

$$Q_3 < Q_2$$

In this case, in molasses separation for example, $Q_3$ may be sufficiently low so that none of component A, sucrose, ever passes through zone 3 to reach outlet port 15. Meanwhile $Q_2$ may be sufficiently high so that component B is swept out of zone 2 by liquid flow 20 and does not reach outlet port 14. In this way it is possible to obtain 100% sucrose recovery without a reduction in product purity. However flows must be precisely controlled to avoid excessive buildup in the concentration of component B, which could further reduce the already small difference:

$$V_b - V_a$$

upon which separation depends.

If means 40 is an appropriate membrane filter, or solvent removal means with similar function, it can beneficially remove a portion of component B, which is predominantly small inorganic molecules in the case of molasses, without any loss of organic material such as sucrose. That will reduce any tendency toward excessive buildup in the concentration of component B.

With respect to the flow of liquid in conduit means 44, solvent removal means 40 may be either upstream or downstream of inlet port 13. Upstream is preferred. If means 40 is located downstream, it must receive a greater volume flow rate by the approximate amount of $Q_f$. However the added volume from which solvent is removed generally will not provide additional removable solvent, since the feedstock is generally as concentrated as practical constraints will allow.

While the invention has been described in connection with the preferred embodiments, it is not intended to limit the invention to the particular forms set forth, but, on the contrary, it is intended to cover such alternatives, modifications and equivalents as may be included within the spirit and scope of the invention as defined by the appended claims.

What is claimed is:

1. In a method for separating and purifying first and second components dissolved in a solvent, comprising a feedstock, by circulating a liquid flow through multiple zones in series, said zones being defined by the locations of inlet and outlet ports to said circulating flow and each zone containing an adsorbent packing, adding said feedstock to said circulating flow at an inlet port in a conduit between two of said zones, effectively circulating said packing through said zones in direction counter to the flow of said circulating liquid, and adjusting the effective flow rates of said packing and of said circulating liquid so that said first component tends to be carried upstream, with reference to said circulating liquid, by said packing, while said second component tends to be carried downstream by said liquid, the improvement which comprises diverting a portion of said circulating flow in said conduit to a separator and removing a flow of said solvent from it, said portion having volume flow rate at least about twice the volume flow rate of said feedstock.

2. The method of claim 1 wherein said portion is substantially the entirety of said circulating flow in said conduit.

3. The method of claim 1 wherein said packing flow occurs in discrete steps at regular intervals, and said diverted portion remains diverted for a period substantially equal to an integer multiple of said interval.

4. The method of claim 1 wherein a portion of either said first component or said second component, but not both, is removed along with said solvent from said circulating liquid.

5. In a method for separating and purifying first and second components dissolved in a solvent, comprising a feedstock, by circulating a liquid flow through multiple zones in series, said zones being defined by the locations of inlet and outlet ports to said circulating flow and each zone containing an adsorbent packing, adding said feedstock to said circulating flow at an inlet port in a conduit between two of said zones, effectively circulating said packing through said zones in a direction counter to the flow of said circulating liquid, and adjusting the effective flow rates of said packing and of said circulating liquid so that said first component tends to be carried upstream, with reference to said circulating liquid, by said packing, while said second component tends to be carried downstream by said liquid, the improvement which comprises diverting a portion of said circulating liquid in said conduit to a separator and removing a flow of said solvent from it, thereby reducing the volume flow rate of said circulating liquid by an amount equal to at least about one half of the volume flow rate of said added feedstock.

6. The method of claim 5 wherein the volume flow rate of said circulating liquid is reduced by an amount substantially equal to said feedstock flow rate.

7. The method of claim 5 wherein the volume flow rate of said circulating liquid is reduced by an amount greater than said feedstock flow rate.

8. The method of claim 5 wherein said packing flow occurs in discrete steps at regular intervals, and said diverted portion remains diverted for a period substantially equal to an integer multiple of said interval.

9. The method of claim 5 wherein a portion of either said first component or said second component, but not both, is removed along with said solvent from said circulating liquid.

* * * * *